United States Patent
Prociw et al.

(10) Patent No.: US 10,731,859 B2
(45) Date of Patent: Aug. 4, 2020

(54) FUEL NOZZLES

(71) Applicant: Delavan Inc., West Des Moines, IA (US)

(72) Inventors: Lev A. Prociw, Johnston, IA (US); Jason A. Ryon, Carlisle, IA (US); Gregory A. Zink, Des Moines, IA (US)

(73) Assignee: Delavan Inc., West Des Moines, IA (US)

( * ) Notice: Subject to any disclaimer, the term of this patent is extended or adjusted under 35 U.S.C. 154(b) by 388 days.

(21) Appl. No.: 15/656,815

(22) Filed: Jul. 21, 2017

(65) Prior Publication Data

US 2019/0024897 A1 Jan. 24, 2019

(51) Int. Cl.

| F23R 3/14 | (2006.01) |
|---|---|
| F23D 11/38 | (2006.01) |
| F23R 3/00 | (2006.01) |
| F23R 3/12 | (2006.01) |
| F23R 3/28 | (2006.01) |
| F02C 7/22 | (2006.01) |

(52) U.S. Cl.
CPC ............... *F23R 3/14* (2013.01); *F02C 7/222* (2013.01); *F23D 11/383* (2013.01); *F23R 3/007* (2013.01); *F23R 3/12* (2013.01); *F23R 3/283* (2013.01); *F23D 2211/00* (2013.01); *F23R 2900/00005* (2013.01)

(58) Field of Classification Search
CPC ........ F02C 7/222; F23D 11/38; F23D 11/383; F23D 2211/00; F23R 3/12; F23R 3/14; F23R 3/283; F23R 3/286
See application file for complete search history.

(56) References Cited

U.S. PATENT DOCUMENTS

| 6,647,729 B2 | 11/2003 | Calvez et al. |
| 6,775,985 B2 | 8/2004 | Mitchell et al. |
| 2008/0308654 A1 | 12/2008 | Pelletier et al. |

(Continued)

FOREIGN PATENT DOCUMENTS

| EP | 2592347 A2 | 5/2013 |
| EP | 3109548 A1 | 12/2016 |

(Continued)

OTHER PUBLICATIONS

Extended European Search Report dated Nov. 19, 2018, issued during the prosecution of European Patent Application No. EP 181829805 (7 pages).

*Primary Examiner* — Scott J Walthour
(74) *Attorney, Agent, or Firm* — Locke Lord LLP; Daniel J. Fiorello; Scott D. Wofsy

(57) ABSTRACT

A nozzle assembly includes a fuel distributor for issuing a spray of fuel. A fuel conduit is in fluid communication with the fuel distributor and has a first end and a second end. The first end and/or the second end of the fuel conduit is operatively connected to the fuel distributor. The fuel conduit is configured to allow relative movement between the first end and the second end to accommodate dimensional variations of at least one of the nozzle assembly or a combustor. A nozzle system includes the nozzle assembly and a combustor wall having a nozzle inlet. The nozzle assembly is positioned adjacent to the nozzle inlet.

16 Claims, 3 Drawing Sheets

(56) References Cited

U.S. PATENT DOCUMENTS

| | | | |
|---|---|---|---|
| 2009/0113893 A1* | 5/2009 | Li | F23R 3/14 |
| | | | 60/737 |
| 2014/0116054 A1 | 5/2014 | Means et al. | |
| 2016/0377292 A1 | 12/2016 | Prociw | |
| 2017/0003029 A1* | 1/2017 | Mook | F23R 3/343 |
| 2017/0058778 A1 | 3/2017 | Bloom et al. | |
| 2018/0216825 A1* | 8/2018 | Patel | F23R 3/005 |

FOREIGN PATENT DOCUMENTS

| | | | | |
|---|---|---|---|---|
| EP | 3109557 | A2 | 12/2016 | |
| EP | 3109557 | A3 | 3/2017 | |
| JP | 5967974 | B2 * | 8/2016 | F01D 25/00 |

* cited by examiner

FUEL NOZZLES

BACKGROUND OF THE INVENTION

1. Field of the Invention

The present invention relates to fuel nozzles, and more particularly to fuel nozzles such as in gas turbine engines.

2. Description of Related Art

The development of Ceramic Matrix Composite (CMC) combustors presents new considerations when designing fuel nozzles that interface with the combustor. For example, thermal expansion and contraction differences between the combustors and the fuel nozzles may require a new approach to ensure these thermal differences are accommodated.

Conventional methods and systems have generally been considered satisfactory for their intended purpose. However, there is still a need in the art for fuel nozzles that allow for improved performance at high temperatures while significantly reducing NOx emissions. There also remains a need in the art for such nozzle assemblies that are easy to make and use. This disclosure provides a solution for these needs.

SUMMARY OF THE INVENTION

A nozzle assembly includes a fuel distributor for issuing a spray of fuel. A fuel conduit is in fluid communication with the fuel distributor and has a first end and a second end. The first end and/or the second end of the fuel conduit is operatively connected to the fuel distributor. The fuel conduit is configured to allow relative movement between the first end and the second end to accommodate dimensional variations of at least one of the nozzle assembly or a combustor.

In accordance with some embodiments, the nozzle assembly includes an outer nozzle shell, an inner nozzle shell positioned radially inward of the outer nozzle shell. The fuel conduit can be positioned between the inner nozzle shell and the outer nozzle shell. The fuel distributor can be between the inner and outer nozzle shells. The fuel distributor can include first and second annular portions that define a fuel circuit therebetween. The fuel circuit can be in fluid communication with the fuel conduit. The fuel conduit can include a metallic material. The fuel conduit can wrap around the periphery of the inner nozzle shell at least once to form a coil shape.

The inner nozzle shell and/or outer nozzle shell can include a swirling air circuit therethrough. The inner nozzle shell can include a fuel feed opening to allow the fuel conduit to operatively connect to a fuel manifold. The nozzle assembly can include axial air swirler positioned radially inward from the inner nozzle shell. The axial air swirler and the inner nozzle shell can define a swirling air circuit therebetween. The inner and outer nozzle shells can include a CMC material. The outer nozzle shell can include a plurality of supports extending therefrom. The supports can be circumferentially spaced apart from one another about the injection axis and configured to engage a combustor wall.

In accordance with another aspect, a nozzle system includes a nozzle assembly, as described above, and a combustor wall having a nozzle inlet. The nozzle assembly is positioned adjacent to the nozzle inlet.

In certain embodiments, an outer air flow passage is defined between an inner peripheral surface of the nozzle inlet and an outer periphery of the nozzle assembly. In accordance with some embodiments, the system includes a fuel manifold in fluid communication with the fuel conduit of the nozzle assembly. The inner nozzle shell can include a fuel feed opening to allow a segment of the fuel conduit to operatively connect to the fuel manifold. The fuel conduit can be biased in compression between the fuel distributor and the fuel manifold to hold the nozzle assembly in place axially against an outer surface of the combustor wall. The outer nozzle shell can include a plurality of supports extending therefrom. The supports can be circumferentially spaced apart from one another about the injection axis and engaged with the combustor wall.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
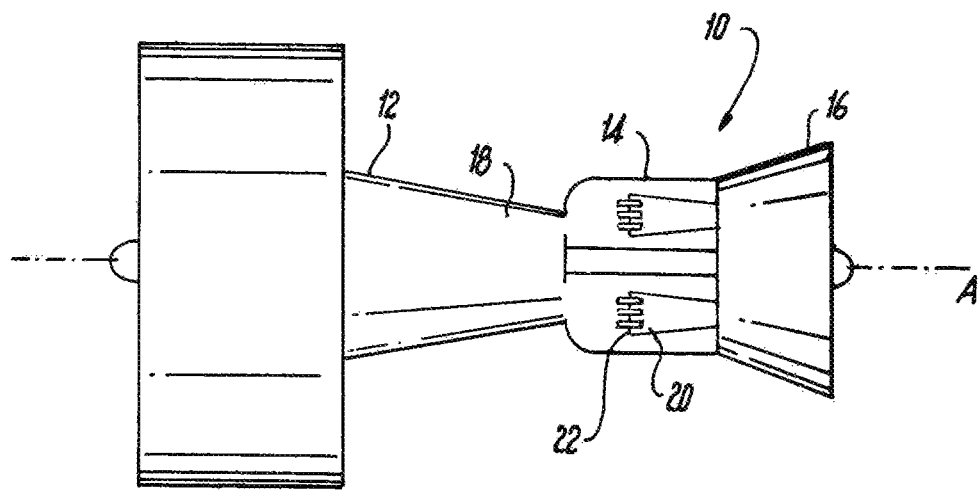
FIG. 1 is a schematic partially cross-sectional side elevation view of an exemplary embodiment of a gas turbine engine constructed in accordance with the present disclosure, showing upper and lower cross-sections of an annular combustor dome.

Reference will now be made to the drawings wherein like reference numerals identify similar structural features or aspects of the subject disclosure. For purposes of explanation and illustration, and not limitation, a partial view of an exemplary embodiment of a gas turbine engine in accordance with the disclosure is shown in FIG. 1 and is designated generally by reference character 10. Other embodiments of nozzle assemblies and systems in accordance with the disclosure, or aspects thereof, are provided in FIGS. 2-4, as will be described. The systems and methods described herein can be used for multipoint injection, such as in gas turbine engines.

Figure 2:
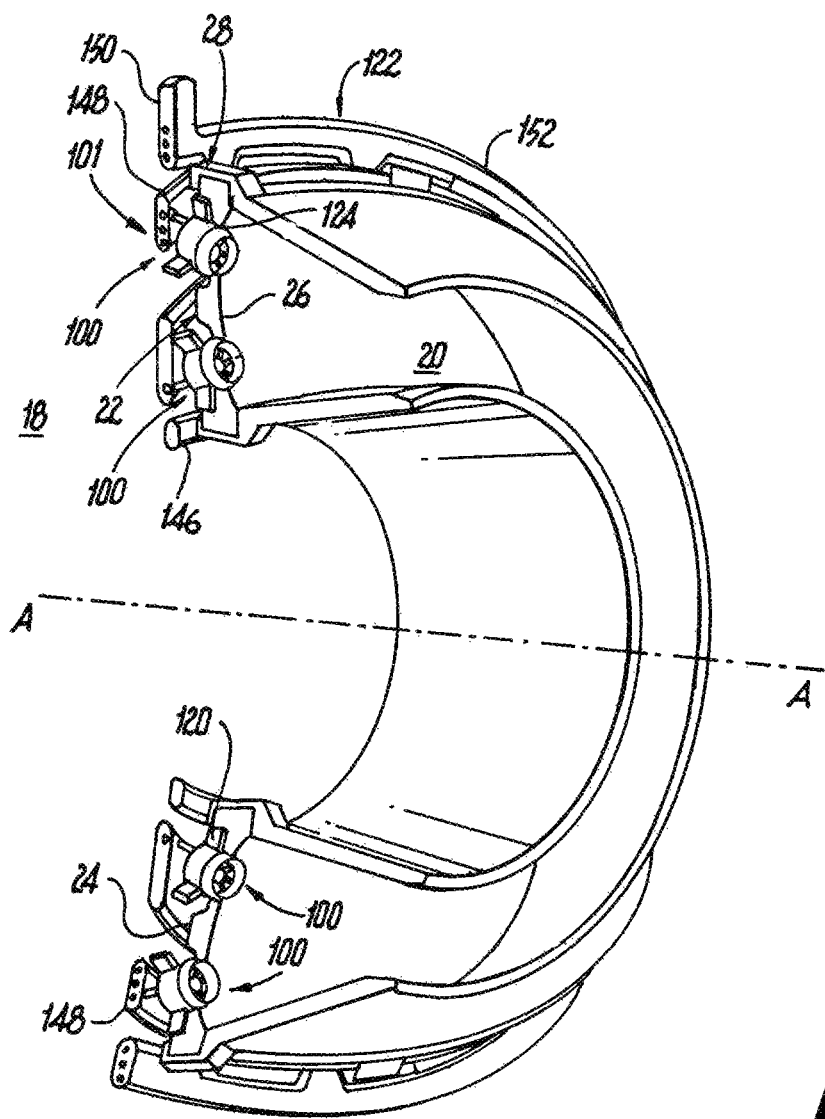
FIG. 2 is a cross-sectional perspective view of the annular combustor dome of FIG. 1, showing a plurality of nozzle assemblies constructed in accordance with the present disclosure.

As shown in FIG. 1, a gas turbine engine 10 includes a compressor section 12 for compressing air to an elevated pressure, a combustor section 14 for burning fuel in the compressed air, and a turbine section 16 for extracting energy from the heated, compressed air to generate shaft work and or exhaust thrust. A combustor dome 22 is the portion of the combustor section 14 that separates the compressor space 18 of compressor 12 from the combustor space 20 of combustor section 14, and introduces fuel and air into the combustor space 20 for combustion. With reference now to FIG. 2, a nozzle system 101 is shown. In one embodiment, nozzle system 101 includes a combustor wall 28 having opposed upstream and downstream faces 24 and 26. Upstream face 24 is configured to face upstream toward a compressor discharge space 18, wherein downstream face 26 is configured to face downstream into combustor space 20. A plurality of nozzle assemblies 100 extend through combustor dome 22 for injection of fuel into combustor space 20. Each nozzle assembly 100 is positioned adjacent to a nozzle inlet 124. A fuel manifold 122 is in fluid communication with each nozzle assembly 100 via a fuel conduit, described below, for delivery of the fuel from a fuel source to nozzle assemblies 100. Fuel manifold 122 includes inner and outer manifold rings 146 and 152.

Figure 3:
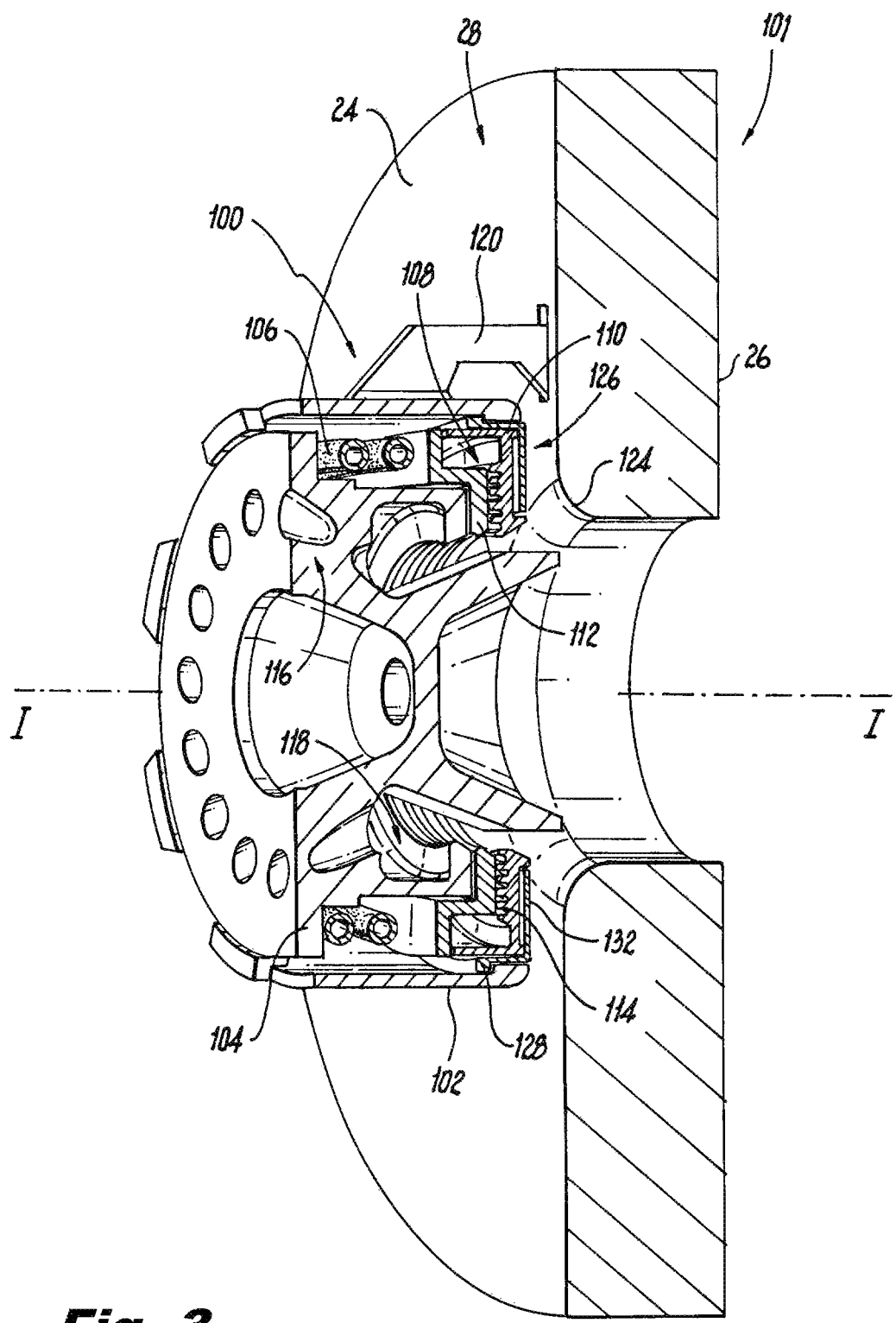
FIG. 3 is a cross-sectional perspective view of one of the nozzle assemblies of FIG. 1, showing a coiled fuel conduit between the inner and outer nozzle shells.

As shown in FIG. 3, each nozzle assembly 100 includes an outer nozzle shell 102 defining an injection axis I, an inner nozzle shell 104 radially inward from outer nozzle shell 102 and a fuel conduit 106 between inner and outer nozzle shells 104 and 102. Fuel conduit 106 has a coil shape that accommodates for differences in temperature between components and differences in thermal expansion and contraction rates between components, and other geometric positional tolerance differences between components of nozzle system 101. In particular, fuel conduit 106 has a coil shape that accommodates for the positional tolerance and thermal mismatch between relatively cold fuel manifold 122, shown in FIGS. 2 and 4, and the relatively hot combustor wall 28. While fuel conduit 106 is shown and described herein as having a coil shape, it is contemplated that another suitable shape to accommodate expansion and contraction forces from fuel manifold 122, combustor wall 28, and/or any other components of nozzle system 101, can be used.

These dimensional variations and mismatches can be due to build tolerances, temperature changes of nozzle assembly components during operation of the nozzle assembly, and different types of materials being used for nozzle assembly and system components. For example, fuel conduit 106 is made from a metallic material and inner and outer nozzle shells 104 and 102, as well as combustor wall 28, could be made from a ceramic matrix composite (CMC) material. The different materials, and the associated differences in coefficients of thermal expansion, combined with the different temperature exposure, means that the rate and timing of thermal expansion and contraction between these components will be different. By having a coil shape, fuel conduit 106 is flexible and accommodates for forces related to these thermal expansion and contraction differences better than traditional linear fuel conduits.

Figure 4:
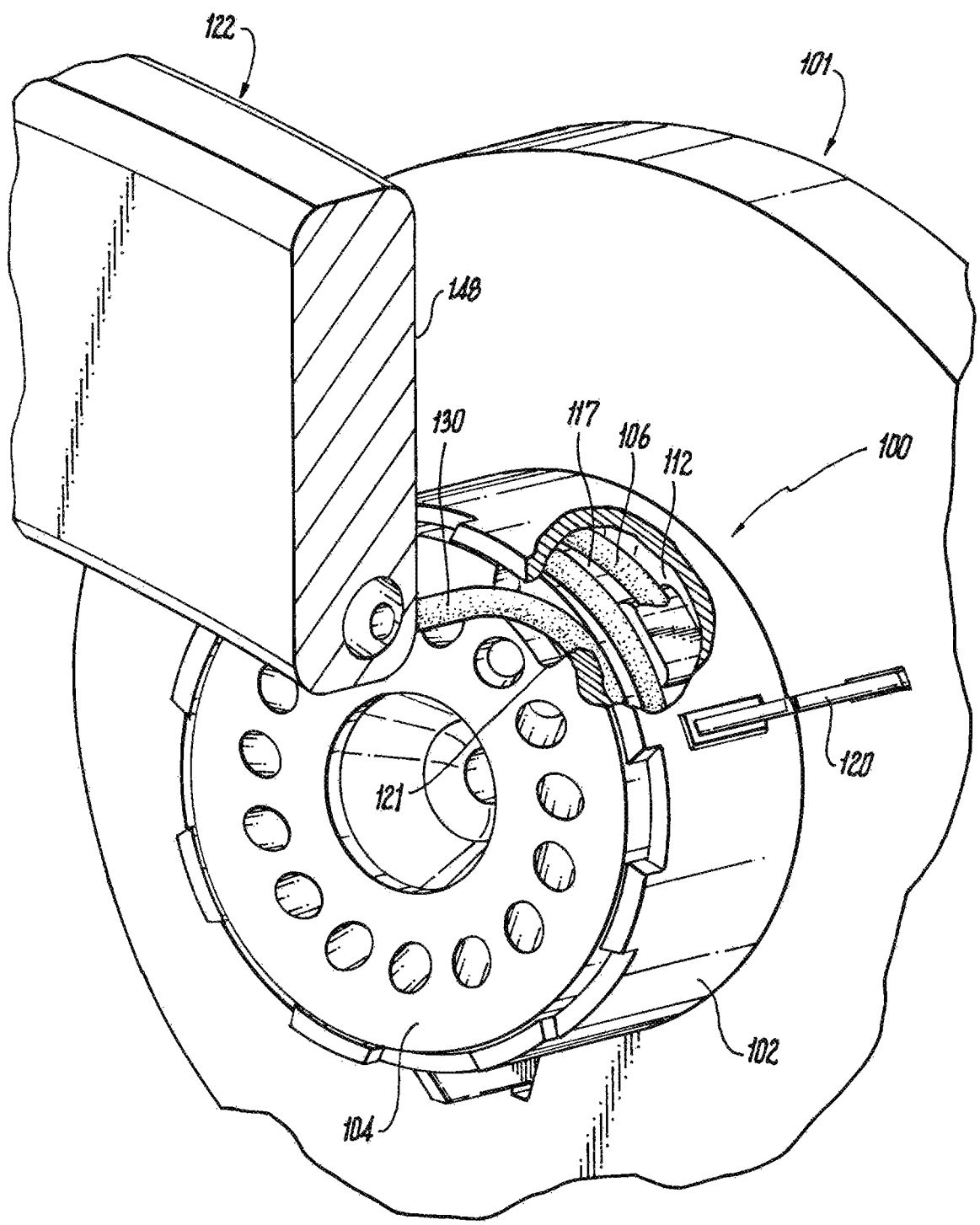
FIG. 4 is a cut-away perspective view of the nozzle assembly of FIG. 3, showing the coiled fuel conduit wrapped around the inner nozzle shell.

With continued reference to FIG. 3, a fuel distributor 108 is in fluid communication with fuel conduit 106 for receiving fuel from fuel conduit 106 and issuing a spray of fuel. Fuel distributor 108 is between inner and outer nozzle shells 104 and 102. Fuel distributor 108 includes first and second annular portions 110 and 112, respectively, which define a fuel circuit 114 therebetween. Fuel circuit 114 is in fluid communication with fuel conduit 106. Fuel circuit 114 is a helically threaded passage defined on a disc surface perpendicular to injection axis I. It is also contemplated that fuel circuit 114 can be defined on a cylindrical surface of first annular portion 110. It is also contemplated that fuel circuit 114 can be defined in second annular portion 112, or in a variety of other suitable arrangements. With reference now to FIGS. 2-4, fuel conduit 106 wraps around a periphery 117 of inner nozzle shell 104, at least once, to form its coil shape. Coiled fuel conduit 106 is biased in compression between nozzle assembly 100, specifically fuel distributor 108, and fuel manifold 122 to hold nozzle assembly 100 in place axially against upstream face 24 of combustor wall 28. Inner nozzle shell 104 includes a fuel feed opening 121 to allow a segment 130 of coiled fuel conduit 106 to operatively connect to fuel manifold 122 via an arm 148. In some embodiments, it is contemplated that outer nozzle shell 102 can also include a portion of or the entire fuel feed opening 121. Segment 130 of fuel conduit 106 is allowed to slide relative to opening 121, further accommodating the dimensional variations described above. Fuel manifold 122 is supplied with fuel via fuel feed arm 150, shown in FIG. 2. Opening 121 can also be enlarged and oriented to allow a coiled segment of coiled fuel conduit 106 to pass through.

As shown in FIG. 3, inner nozzle shell 104 defines a swirling air circuit 118 therethrough. Nozzle assembly 100 includes axial air swirler 116 integral with inner nozzle shell 104 on a radially inward side of inner nozzle shell 104. Axial air swirler 116 defines swirling air circuit 118. It is also contemplated that a discrete axial air swirler can be positioned radially inward from inner nozzle shell 104 and a swirling air circuit can be defined between the discrete axial air swirler and inner nozzle shell 104. Outer nozzle shell 102 includes a plurality of supports 120 extending therefrom. Supports 120 are circumferentially spaced apart from one another about injection axis I and configured to engage a combustor wall 28. Each nozzle assembly 100 includes a heat shield 128 positioned radially outward from first annular portion 110. An outer air flow passage 126 is defined between nozzle inlet 124 and an outer periphery 132 of each nozzle assembly 100. In this embodiment, outer periphery 132 is an outer surface of heat shield 128. The flexibility of coiled fuel conduit 106 also accommodates tolerance variations in the location of nozzle assembly 100 with respect to nozzle inlet 124 in combustor wall 28, further accommodating differences in thermal expansion characteristics, for example, those between combustor wall 28 and nozzle assembly 100.

Those skilled in the art will readily appreciate that while shown and described with one fuel circuit and one air circuit in each nozzle, any suitable number of fuel and air circuits can be used without departing from the scope of this disclosure. The arrangements disclosed herein can be suitable for ceramic and ceramic matrix material constructions, and can improve heat transfer to the dome plate relative to conventional arrangements.

The methods and systems of the present disclosure, as described above and shown in the drawings, provide for nozzle assemblies with superior properties including improved tolerance accommodation for assemblies that use both metallic and CMC materials. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A nozzle assembly, comprising:
    a fuel distributor for issuing a spray of fuel;
    a fuel conduit in fluid communication with the fuel distributor, the fuel conduit having a first end and a second end, wherein at least one of the first end or second end is operatively connected to the fuel distributor; and
    an outer nozzle shell and an inner nozzle shell positioned radially inward of the outer nozzle shell, wherein the fuel conduit is positioned between the inner nozzle shell and the outer nozzle shell, wherein the inner nozzle shell includes a fuel feed opening to allow the fuel conduit to operatively connect to a fuel manifold, wherein a segment of the fuel conduit is allowed to slide relative to the fuel feed opening, and wherein the fuel conduit wraps around a periphery of the inner nozzle shell at least once to form a coil shape such that the fuel conduit is configured to allow relative movement between the first end and the second end to accommodate dimensional variations of at least one of the nozzle assembly or a combustor.

2. The nozzle assembly as recited in claim 1, wherein the fuel distributor is between the inner and outer nozzle shells and includes a first annular portion and a second annular portion, a fuel circuit being defined between the first annular portion and the second annular portion.

3. The nozzle assembly as recited in claim 2, wherein the fuel circuit is in fluid communication with the fuel conduit.

4. The nozzle assembly as recited in claim 1, wherein at least one of the inner nozzle shell or the outer nozzle shell defines a swirling air circuit therethrough.

5. The nozzle assembly as recited in claim 1, wherein the fuel conduit comprises a metallic material.

6. The nozzle assembly as recited in claim 1, further comprising an axial air swirler positioned radially inward from the inner nozzle shell.

7. The nozzle assembly as recited in claim 1, wherein the inner and outer nozzle shells comprise a CMC material.

8. A nozzle system comprising:
   a nozzle assembly including a fuel distributor for issuing a spray of fuel and a fuel conduit in fluid communication with the fuel distributor, the fuel conduit having a first end and a second end, wherein at least one of the first end or second end is operatively connected to the fuel distributor; and
   a combustor wall having a nozzle inlet, wherein the nozzle assembly is positioned adjacent to the nozzle inlet,
   wherein the nozzle assembly includes an outer nozzle shell and an inner nozzle shell positioned radially inward of the outer nozzle shell, wherein the fuel conduit is positioned between the inner nozzle shell and the outer nozzle shell, wherein the inner nozzle shell includes a fuel feed opening to allow a segment of the fuel conduit to operatively connect to a fuel manifold, wherein the segment of the fuel conduit is allowed to slide relative to the fuel feed opening, and wherein the fuel conduit wraps around a periphery of the inner nozzle shell at least once to form a coil shape such that the fuel conduit is configured to allow relative movement between the first end and the second end to accommodate dimensional variations of at least one of the nozzle assembly or a combustor.

9. The nozzle system as recited in claim 8, wherein the fuel distributor is between the inner and outer nozzle shells and includes a first annular portion and a second annular portion, a fuel circuit being defined between the first annular portion and the second annular portion.

10. The nozzle system as recited in claim 8, wherein the outer nozzle shell includes a plurality of supports extending therefrom, circumferentially spaced apart from one another about an injection axis and engaged with the combustor wall.

11. The nozzle system as recited in claim 8, wherein the inner and outer nozzle shells comprise a CMC material.

12. The nozzle system as recited in claim 8, and wherein an outer air flow passage is defined between an inner peripheral surface of the nozzle inlet and an outer periphery of the nozzle assembly.

13. The nozzle system as recited in claim 8, further comprising a fuel manifold in fluid communication with the fuel conduit of the nozzle assembly.

14. The nozzle system as recited in claim 13, wherein the fuel conduit is biased in compression between the fuel distributor and the fuel manifold to hold the nozzle assembly in place axially against an outer surface of the combustor wall.

15. The nozzle assembly as recited in claim 1, wherein the fuel feed opening is on an outer diameter of the inner nozzle shell and extends radially inward from the outer diameter of the inner nozzle shell.

16. The nozzle system as recited in claim 8, wherein the fuel feed opening is on an outer diameter of the inner nozzle shell and extends radially inward from the outer diameter of the inner nozzle shell.

* * * * *